US 6,738,730 B2

(12) United States Patent
Sato et al.

(10) Patent No.: US 6,738,730 B2
(45) Date of Patent: May 18, 2004

(54) PERFORMANCE CONTROL APPARATUS AND METHOD FOR DATA PROCESSING SYSTEM

(75) Inventors: Masaru Sato, Yokohama (JP); Katsuhisa Miyata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/226,155

(22) Filed: Aug. 23, 2002

(65) Prior Publication Data

US 2003/0055602 A1 Mar. 20, 2003

(30) Foreign Application Priority Data

Sep. 12, 2001 (JP) ........................................ 2001-276730

(51) Int. Cl.[7] .............................................. G05B 19/00
(52) U.S. Cl. ........................................ 702/182; 700/32
(58) Field of Search .......................... 702/182, 35, 36, 702/58, 81, 84, 183, 184, 185, 186; 700/9, 28, 32, 36, 46, 108, 109, 110; 324/528; 706/45; 714/100, 47, 51, 55

(56) References Cited

U.S. PATENT DOCUMENTS 5,179,693 A * 1/1993 Kitamura et al. ............ 713/601
6,374,367 B1 * 4/2002 Dean et al. .................... 714/37
6,542,938 B1 * 4/2003 Kamen et al. ................ 709/328

* cited by examiner

Primary Examiner—Marc S. Hoff
Assistant Examiner—Edward Raymond
(74) Attorney, Agent, or Firm—Mattingly, Stanger & Malur, P.C.

(57) ABSTRACT

A processing unit (processor) performs processing of programs. A monitoring unit measures the rate of operation of an instruction processor in the processing unit. Information which is a standard for judging modification of the performance is stored in a control information memory unit. A control unit judges on the basis of the operation rate of the processor collected by the monitoring unit and the control information stored in the control information memory unit whether it is necessary to modify the performance or not and controls to modify the performance of the processor on the basis of the judged result.

10 Claims, 9 Drawing Sheets

EXAMPLE OF CONTROL
INFORMATION TABLE

| COMPUTER PERFORMANCE INFORMATION PORTION ~2010 | | OPERATION INFORMATION PORTION ~2020 | CONTROL INFORMATION PORTION 1 ~2030 | CONTROL INFORMATION PORTION 2 ~2040 | CONTROL INFORMATION PORTION 3 ~2050 |
|---|---|---|---|---|---|
| MODIFICATION RANGE OF PERFORMANCE (UNIT : MIPS) | | CURRENT PERFORMANCE VALUE (UNIT : MIPS) | *1 | *2 | *3 |
| UPPER LIMIT | LOWER LIMIT | 200 | | | |
| 300 | 100 | | | | |

FIG. 2B

| PRESENCE OF CONTRACT | KIND OF CONTRACT | DURATION OF CONTRACT (MONTH(S)) | MODIFICATION RANGE OF PERFORMANCE (MIPS) | | STANDARD VALUE OF PERFORMANCE (%) | | STANDARD VALUE OF DURATION (SECOND(S)) | MODIFICATION WIDTH AT A TIME (MIPS) | INTERVAL VALUE (SECOND(S)) |
|---|---|---|---|---|---|---|---|---|---|
| | | | UPPER LIMIT | LOWER LIMIT | UPPER LIMIT | LOWER LIMIT | | | |
| FLAG | *4 | 37 | 250 | 50 | 90 | 60 | 360 | 10 | 60 |
| 1 | B | | | | | | | | |

FIG. 2C

| FORCED MODIFICATION CONTROL ||
|---|---|
| FLAG | PERFORMANCE FOR MODIFICATION (UNIT: MIPS) |
| 0 | 250 |

FIG. 2D

| CONTRACT DURATION (NUMBER OF MONTHS) | REDUCTION RATE |
|---|---|
| 1~12 | 5 |
| 13~36 | 10 |
| 37~60 | 20 |
| 61 OR MORE | 40 |

FIG. 2E

| MIPS | UNIT PRICE (¥/h) |
|---|---|
| 0~99 | 200 |
| 100~199 | 400 |
| 200~299 | 800 |
| 300 OR MORE | 1600 |

FIG. 2F

| IDENTIFIER | CONTENTS OF CONTRACT |
|---|---|
| A | FULL MEASURED-RATE SYSTEM |
| B | MEASURED-RATE SYSTEM WITHIN DESIGNATED CONTRACT |
| C | FULL FIXED RATE SYSTEM |
| D | FIXED RATE SYSTEM + MEASURED-RATE SYSTEM |
| E | FIXED RATE SYSTEM + MEASURED-RATE SYSTEM WITHIN DESIGNATED CONTRACT |

FIG. 3

MONITORED DATA TABLE 7010

| MEASUREMENT TIME (h : m : s) | PERFORMANCE VALUE (MIPS) | OPERATION RATE DATA (USAGE RATE OF CPU) (%) |
|---|---|---|
| 9 : 38 : 00 ~ 9 : 38 : 59 | 50 | 70 |
| 9 : 39 : 00 ~ 9 : 39 : 59 | 50 | 99 |
| 9 : 40 : 00 ~ 9 : 40 : 59 | 50 | 91 |
| 9 : 41 : 00 ~ 9 : 41 : 59 | 50 | 97 |
| 9 : 42 : 00 ~ 9 : 42 : 59 | 50 | 96 |
| 9 : 43 : 00 ~ 9 : 43 : 59 | 50 | 92 |
| 9 : 44 : 00 ~ 9 : 44 : 59 | 50 | 95 |
| 9 : 45 : 00 ~ 9 : 45 : 59 | 60 | 80 |
| 9 : 46 : 00 ~ 9 : 46 : 59 | 60 | 75 |

OPERATION INFORMATION AND
CALCULATION EXAMPLE OF CHARGE

| TIME | MIPS USED | | UNIT PRICE OF MIPS (¥/h) | HOUR (h) | CHARGE (¥) |
|---|---|---|---|---|---|
| 9:00 ~ 9:45 | 50 | → | 200 | 0.75 | 150 |
| 9:45 ~ 10:15 | 180 | → | 400 | 0.50 | 200 |
| 11:15 ~ 12:00 | 250 | → | 800 | 0.75 | 600 |
| 12:00 ~ 13:00 | 50 | → | 200 | 1.00 | 200 |
| 13:00 ~ 17:00 | 120 | → | 400 | 4.00 | 1600 |
| | | | | | 2750 |

PERFORMANCE CONTROL APPARATUS AND METHOD FOR DATA PROCESSING SYSTEM

BACKGROUND OF THE INVENTION

The present invention relates to a performance control apparatus and more particularly to a performance control apparatus that can modify performance in accordance with the rate of operation of an instruction processor.

In the construction of a computer system, the processing power or the maximum processing speed of a computer is determined to match an expected maximum amount of operation. On the other hand, in operation, the rate of operation is monitored to examine the sufficiency of the processing power and the data monitored and the like are collected to be stored as operation history. The stored data can be analyzed to thereby extremely eliminate impediment to operation due to lack of the processing power.

SUMMARY OF THE INVENTION

As described above, in the conventional computer system, the processing power of the computer is selected to match the expected maximum amount of operation. Accordingly, the charge paid by the user for use of the computer is not set to an actual amount of operation but is set to the maximum amount of operation, so that there is a problem from the viewpoint of service to the user.

Further, when the amount of operation is increased rapidly and exceeds the maximum amount of operation, the processing of operation is sometimes inversely affected.

Furthermore, when monitoring and modification of the processing power of a processing unit (CPU) in the operation are made manually, immediate processing to cope with the rapidly increased amount of operation cannot be attained, so that the operation is adversely affected and the cost is raised.

It is an object of the present invention to provide a performance control apparatus that can modify performance of an operation control unit in accordance with the rate of operation to exhibit the performance conformable to variation in an amount of operation.

According to the present invention, in order to solve the above problems, the following measures are adopted.

The performance control apparatus according to the present invention comprises an operation processing unit that can control performance represented by the number of instructions executed per unit time by means of hardware, a monitoring unit that measures the performance, a control unit that controls to modify the performance of the operation processing unit, a control information memory unit that stores control information which is a reference or standard for modifying the performance, and a history information memory unit that stores history information of the performance measured by the monitoring unit, whereby the control unit controls to modify the performance on the basis of the control information and the history information.

Other objects, features and advantages of the invention will become apparent from the following description of the embodiments of the invention taken in conjunction with the accompanying drawings.

DESCRIPTION OF THE EMBODIMENTS

Figure 1:
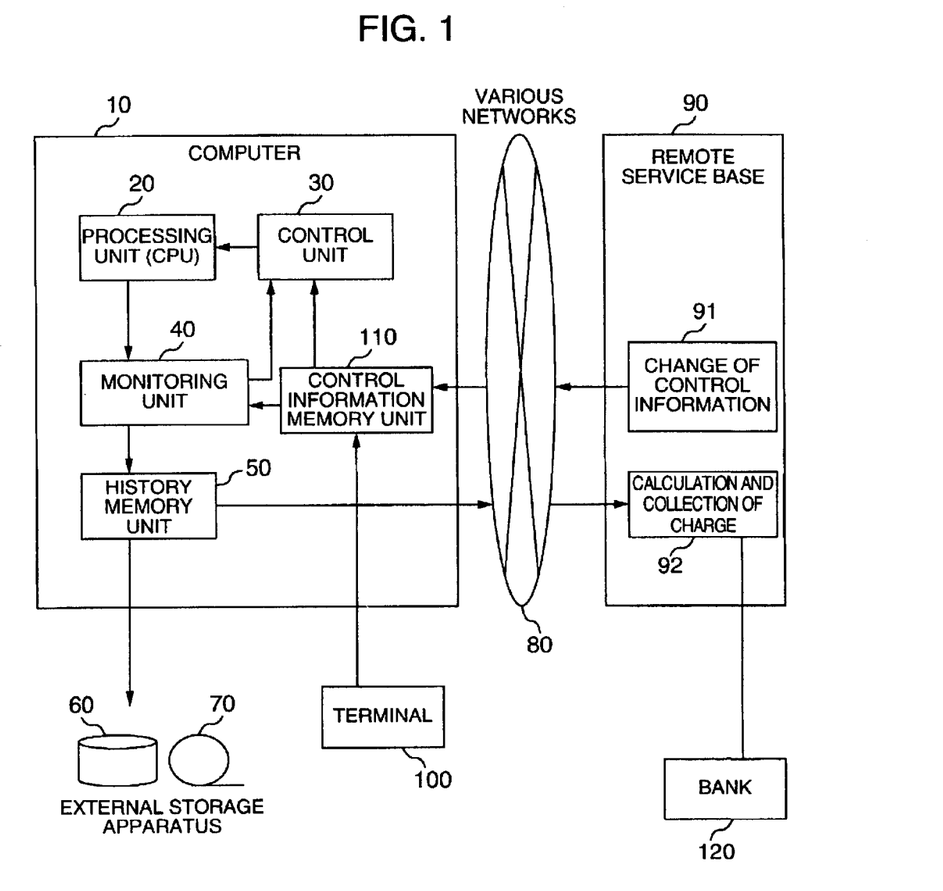
FIG. 1 is a block diagram schematically illustrating a performance control unit according to an embodiment of the present invention.

Embodiments of the present invention are now described with reference to the accompanying drawings. FIG. 1 is a block diagram schematically illustrating a performance control apparatus according to an embodiment of the present invention. The performance control apparatus includes a computer 10 having the performance to be modified, a processing unit 20 (processor) for processing or executing programs, a monitoring unit 40 for measuring the rate of operation of an instruction processor in the processor unit 20, a control information memory unit 110 for storing information (the rate of operation, a duration and the like of the processor) which is the reference or standard for judging modification of the performance, a control unit 30 for judging on the basis of the operation rate of the processor collected by the monitoring unit 40 and the control information stored in the control information memory unit 110 whether it is necessary to modify the performance or not and controlling to modify the performance of the processor on the basis of the judged result, a history memory unit 50 for storing modification history of the performance and the operation time collected by the monitoring unit 40 in external storage apparatuses, and external storage apparatuses 60 and 70 for storing information in the history memory unit 50.

Further, the performance control apparatus includes a network 80 for connecting the computer 10 and a remote operation terminal 90 and the remote operation terminal 90 connected through the network 80 to the computer. Furthermore, stored in the control information memory unit 110 of the computer 10 are information as to whether there is contract with the user of the computer or not, contract contents indicating a modification range of the performance when there is the contract, an interval value indicating the interval at which operation of the processing unit 20 is monitored, the operation rate and the duration data of the instruction processor which are the standard for modification of the performance, and indication information for modification of the performance from the network. The remote operation terminal 90 includes control information modification means 91 for modifying information in the control information memory unit 110 in the computer 110 and charge calculation and collection means 92 for getting the information stored in the history memory unit 50 and calculating the charge for using the processor. A financial agency 120 performs collection and settlement of the charge. Further, the calculation of the charge may be made by the computer 10. Numeral 100 denotes a terminal having an interface for displaying and modifying information stored in the control information memory unit 110.

Figure 2A:
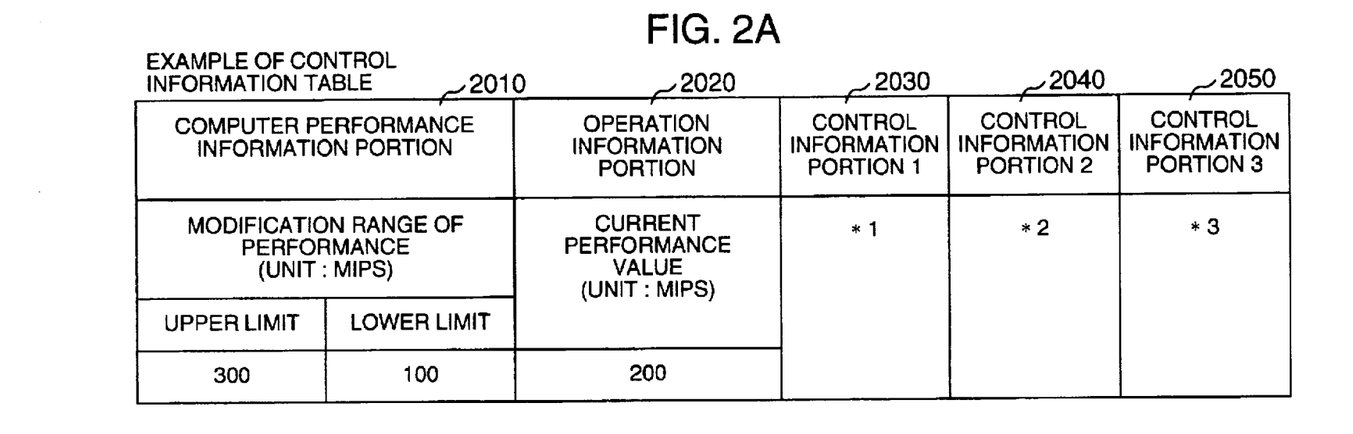
FIGS. 2A to 2F show examples of control tables stored in a control information memory unit.
Figure 2B:
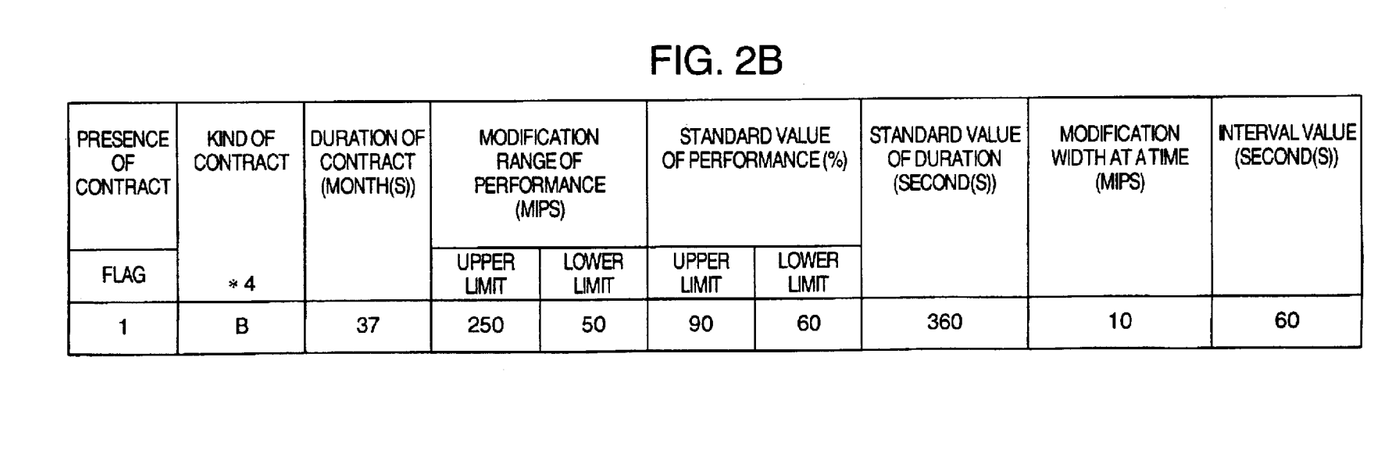
Figure 2C:
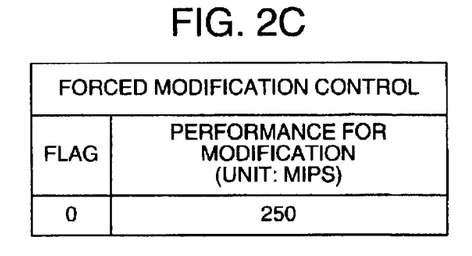
Figure 2D:
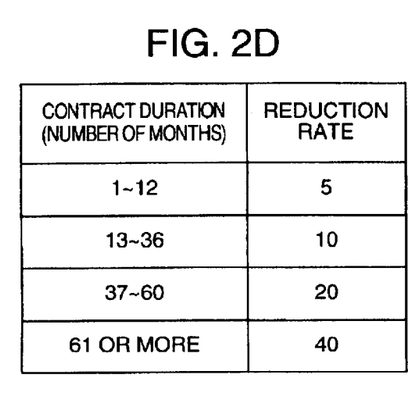
Figure 2E:
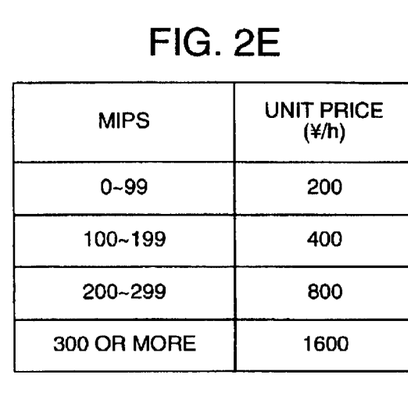
Figure 2F:
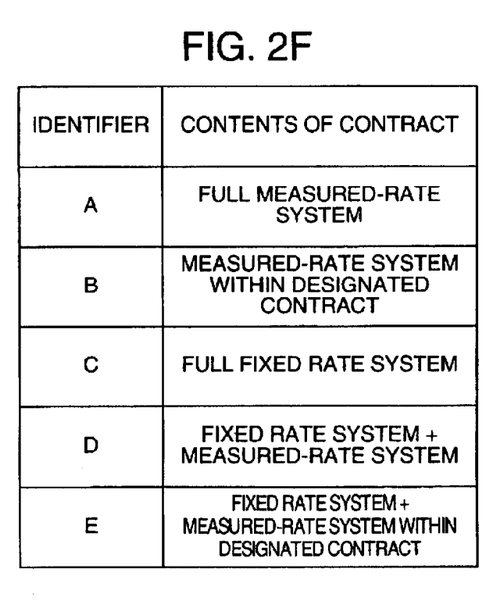

FIGS. 2A to 2F show examples of control information tables in the control information memory unit 110. FIG. 2A shows an example of the control information table. FIG. 2B shows a control information portion 1 (2030) of the control information table, FIG. 2C shows a control information portion 2 (2040) of the control information table, FIG. 2D shows a control information portion 3 (2050) of the control information table, FIG. 2E shows a continuation of the control information portion 3 (2050) of the control information table shown in FIG. 2D, and FIG. 2F shows kinds of contract of the control information portion 1 in detail.

In FIG. 2A, the control information table includes a computer performance information portion 2010, an operation information portion 2020, the control information portion 1 (2030), the control information portion 2 (2040) and the control information portion 3 (2050). The computer performance information portion 2010 includes an upper limit and a lower limit as the modification range of the performance (processing speed) of the computer itself. In this example, the upper limit is 300 MIPS and the lower limit is 100 MIPS. The operation information portion 2030 indicates performance value which is information of the operation state at present. In this example, the operation information portion 2020 indicates that the processing power or the maximum processing speed at present is 200 MIPS.

The control information portion 1 (2030) shown in FIG. 2B includes information representing the presence of contract which is the standard for judging modification of the performance, kind of the contract, duration of the contract, modification range of the performance, a standard value of the performance, a standard value of the duration, a modification width at a time and an interval value.

The kind of contract is represented by a unique identifier shown in FIG. 2F in accordance with contract coverage. The duration of contract is a period from conclusion of the contract for collection of the charge accompanied by modification of the performance until the present time. The modification range of the performance in FIG. 2B indicates the upper limit and the lower limit at the time that the performance is modified. Information stored in the modification range of the performance is different depending on the kind of contract. For example, when the kind of contract is A, C or D shown in FIG. 2F, the modification range of the performance has the same upper and lower limits as those in the modification range of performance in the computer performance information portion 2010. On the other hand, when the kind of contract in FIG. 2E is B or E, the modification range of the performance has the upper and lower limits of the performance based on the contract. In this example, there is the contract of the measured rate system within a designated contract and the upper and lower limits of the performance within the contract range are 250 and 50 MIPS, respectively. The standard value of performance and the standard value of duration represent upper and lower limits of the rate of operation of the instruction processor and a duration at the time that the control unit 30 judges whether the performance is modified or not. This example shows that the performance is modified when the state that the rate of operation of the instruction processor is larger than or equal to 90% or smaller than or equal to 60% continues 360 seconds. The modification width at a time represents information of the modification width at the time that the control unit 30 instructs the processing unit 20 to modify the performance and the interval value represents an interval at which the rate of operation of the instruction processor is monitored. In this example, the modification width at a time is 10 MIPS and the interval value of the instruction processor is 60 seconds.

The control information portion 2 (2040) shown in FIG. 2C is information for controlling forced modification of the performance and shows a flag for indicating modification and a performance value at the time that the modification is made. In this example, the flag is "0" indicating that there is no forced modification. The control information 3 (2050) shown in FIGS. 2D and 2E show the duration of contract, a reduction rate of the charge corresponding to the previously set duration of contract and unit price per a MIPS for each performance.

Figure 3:
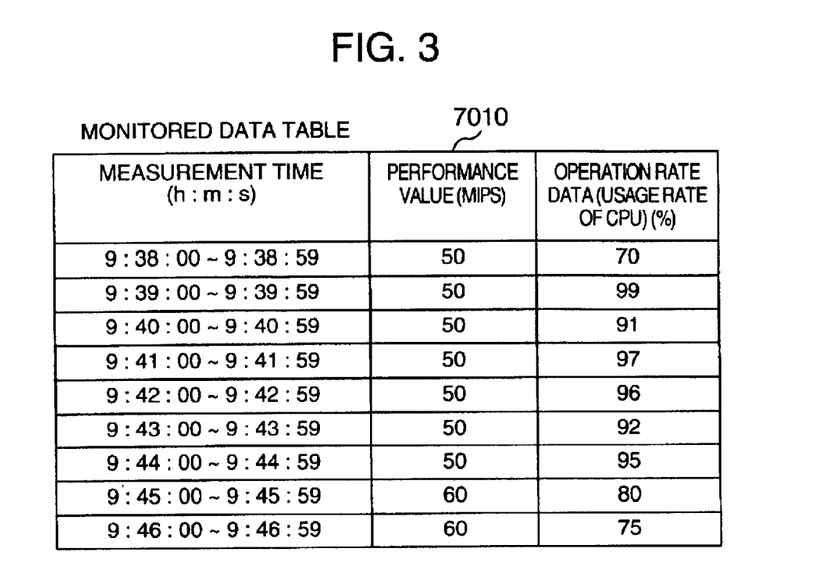
FIG. 3 shows a monitored data table.

FIG. 3 is a diagram showing a monitored data table of history information collected by the monitoring unit 40 and stored in the history memory unit, that is, the modification history of the performance and operation time information stored in the history memory unit. As shown in FIG. 3, the performance value (MIPS) for each minute and the operation rate data (the usage rate of use of CPU) are stored in the monitored data table. In this example, since the performance exceeds the upper limit 90% of the standard value of the performance in the control information table shown in FIG. 2B continuously 360 seconds or more which is the standard value of the duration, the performance (MIPS) is changed or modified from 50 MIPS to 60 MIPS at time "9:45:00".

Figure 4:
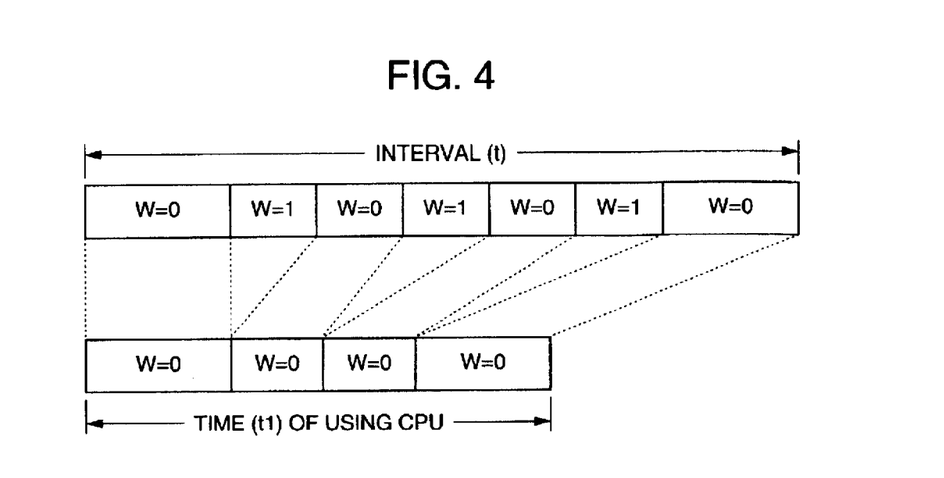
FIG. 4 is a diagram explaining a method of calculating the rate of operation.

FIG. 4 is a diagram explaining the method of calculating the rate of operation (the usage rate of CPU). In this example, when a W bit (waiting bit) of PSW (program state word) indicating the execution state of the program are on (W=1), the program is not executed and this is the time that the CPU is not used. When W=0, it indicates that the W bit (waiting bit) is off state. By measuring this time by a timer or the like, the operating rate (the usage rate of CPU) in a predetermined period (interval) can be calculated by the following equation.

The rate of operation (the usage rate of CPU) can be calculated by the use time of CPU (t1)/the interval (t).

Figure 5:
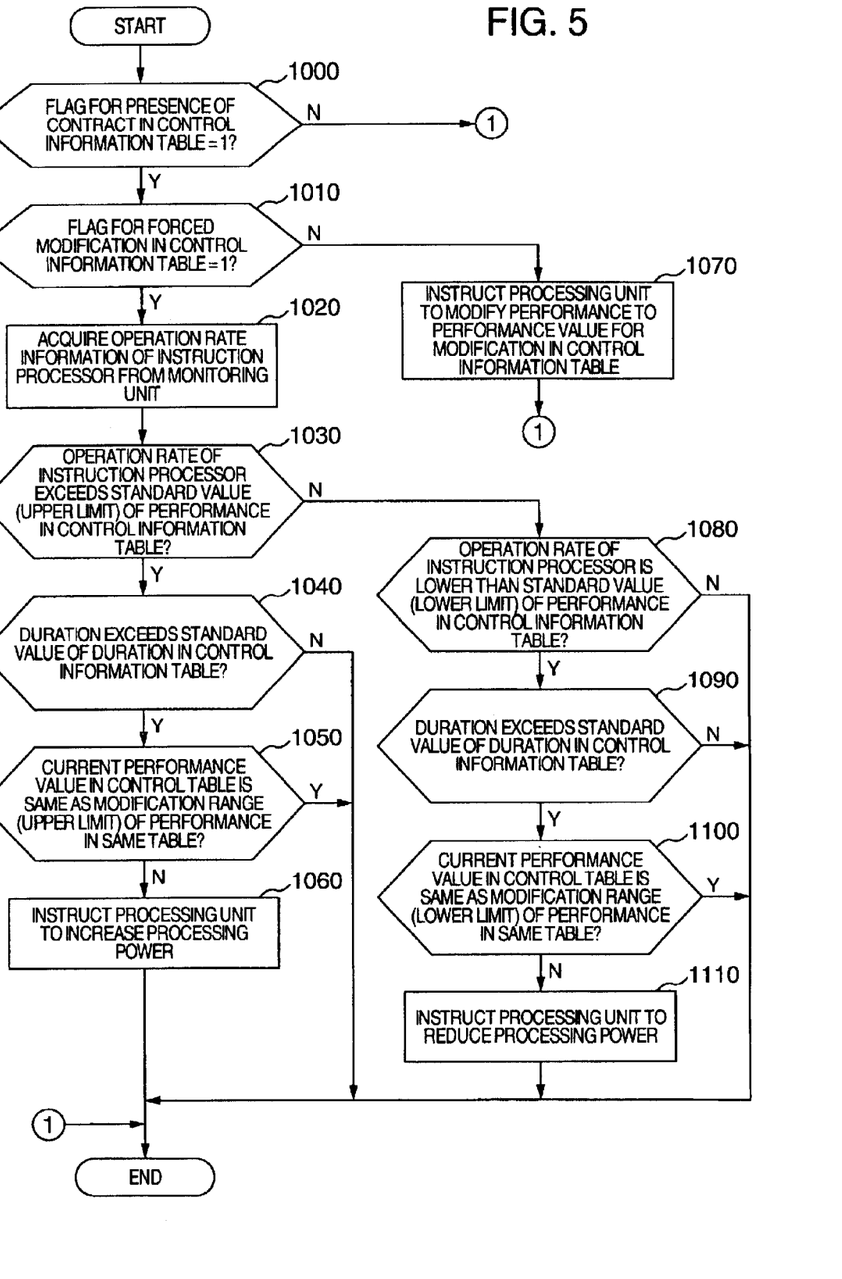
FIG. 5 is a flow chart showing processing of the control unit.

FIG. 5 is a flow chart showing processing of the control unit 30. First, in step 1000, the flag indicating whether the contract is made or not is judged by referring to the control information table (FIG. 2A) in the control information memory unit 110 and when the computer does not make the contract, the processing is ended without implementation of any processing. When the computer is a contractual one, the processing proceeds to step 1010. In step 1010, the flag for the forced modification in the control information table is judged and when the forced modification is indicated, the processing proceeds to step 1070, in which the processing unit 20 is instructed to modify the performance to a performance value for modification in the control information table and the processing is ended. When the forced modification is not indicated, the processing proceeds to step 1020, in which the operation rate information of the instruction processor is acquired from the monitoring unit 40. In step 1030, it is judged whether the operation rate of the instruction processor exceeds the standard value of the performance (upper limit) in the control information table or not. When the standard value (upper limit) is exceeded, the processing proceeds to step 1040 and when it is not exceeded, the processing proceeds to step 1080. In step 1040, it is judged whether the operation rate exceeds the standard value of the duration in the control information table and this state is continued or not. When the standard value of the duration is exceeded and this state is continued, the process proceeds to step 1050 and when it is not exceeded or the state is not continued, the processing is ended. In step 1050, the current performance value in the control information table is compared with the modification value (upper limit) of the performance. When there is room for modification of the processing power, the processing proceeds to step 1060 and when there is no room, the processing is ended. In step 1060, the processing unit 20 is instructed to increase the processing power and the processing is ended.

In step 1080, it is judged whether the operation rate of the instruction processor is lower than the standard value (lower value) of the performance or not. When it is lower than the standard value (lower limit) of the performance, the processing proceeds to step 1090 and when it is not lower, the processing is ended. In step 1090, it is judged whether the standard value of the duration is exceeded and this state is continued or not. When the standard value of the duration is exceeded and this state is continued, the processing proceeds to step 1100 and when it is not exceeded or the state is not continued, the processing is ended. In step 1100, the current performance value in the control information table is compared with the modification value (lower limit) of the performance. When there is room for modification of the processing power, the processing proceeds to step 1110 and when there is no room, the processing is ended. In step 1110, the processing unit 2 is instructed to reduce the processing power and the processing is ended.

Figure 6A:
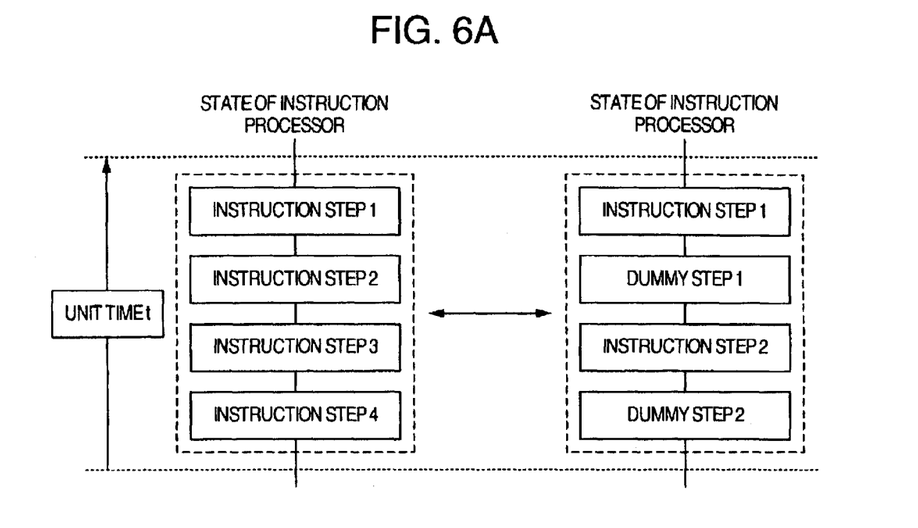
FIGS. 6A and 6B are diagrams explaining modification of the processing power of a processing unit.
Figure 6B:
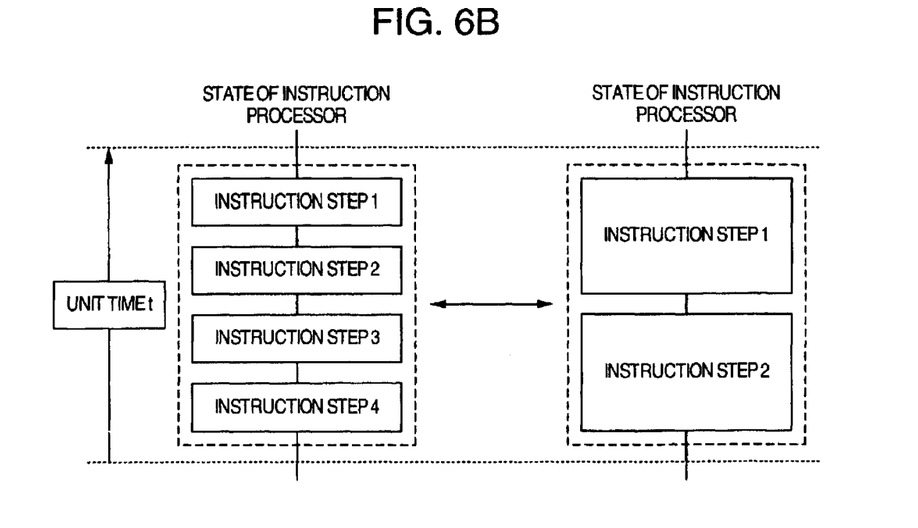

FIGS. 6A and 6B are diagrams explaining a method of modifying the processing power of the processing unit. FIG. 6A explains a method using insertion and deletion of dummy step and FIG. 6B explains a method using modification of a machine cycle.

In FIG. 6A, the performance of four instructions/unit time as shown on the left side thereof can be modified to the performance of two instructions/unit time by inserting dummy steps in which nothing is made actually as shown on the right side of FIG. 6A.

In FIG. 6B, the performance of four instructions/unit time as shown on the left side thereof can be modified to the performance of two instructions/unit time as shown on the right side of FIG. 6B by modifying a necessary time for one processing unit.

The processing unit 20 can adopt any or both of the above methods to modify the performance. Further, a plurality of modules having different levels of performance may be provided previously and the modules may be changed over.

Figure 7A:
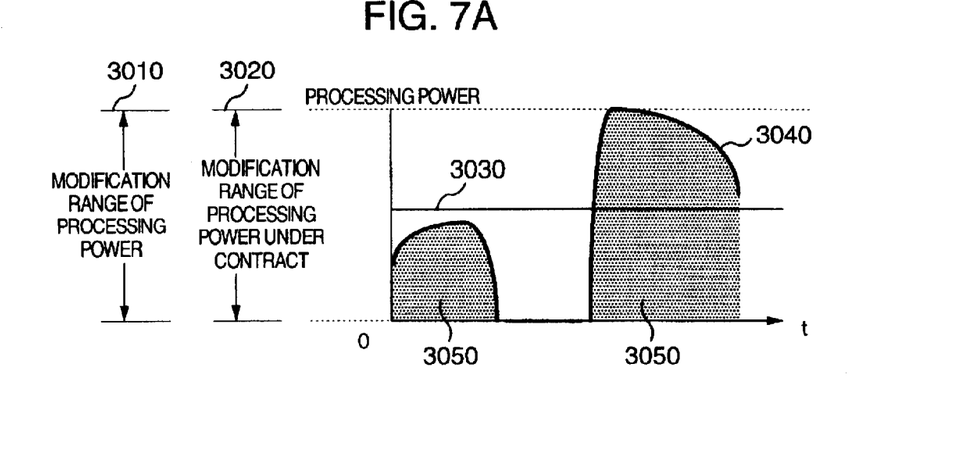
FIGS. 7A and 7B are diagrams explaining the charges for using for kinds of contract.
Figure 7B:
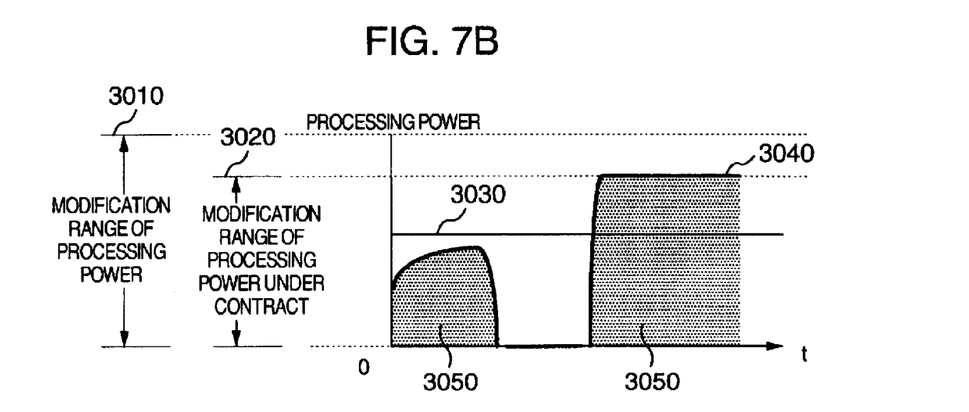
Figure 8A:
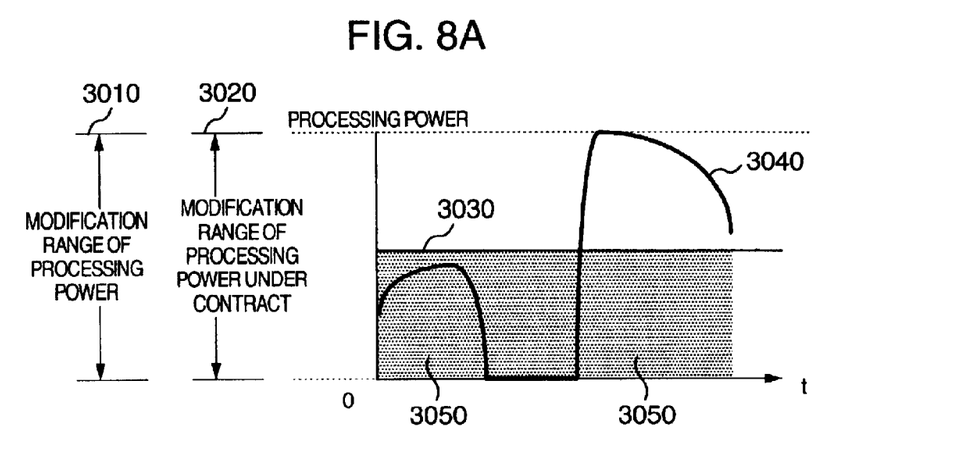
FIGS. 8A and 8B are diagram explaining the charges for using for kinds of contact.
Figure 8B:
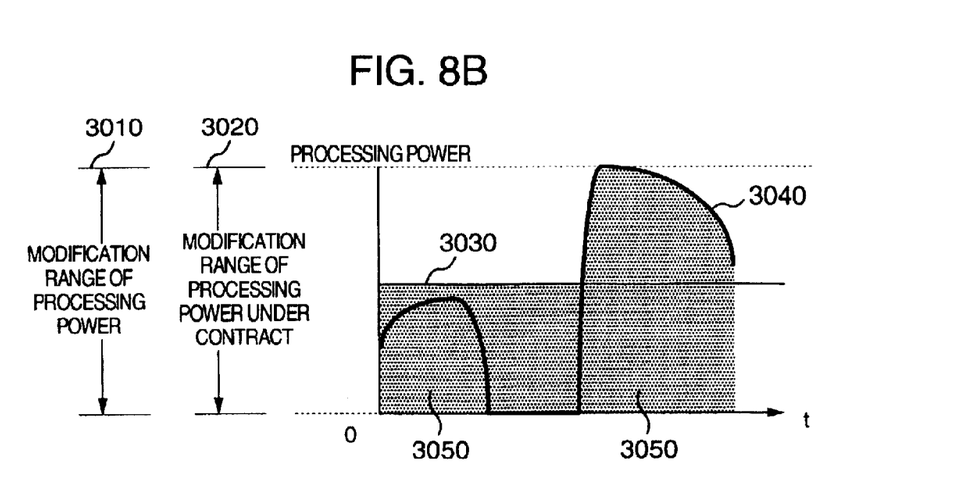
Figure 9:
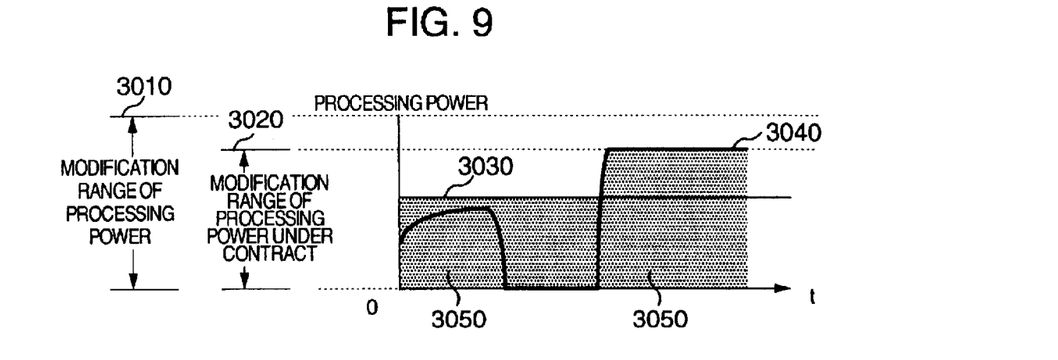
FIG. 9 is a diagram explaining the charge for using for a kind of contact.

FIGS. 7A, 7B, 8A, 8B and 9 show the charges for kinds of contract. In these drawings, numeral 3010 denotes a modification range of the processing power of computer, 3020 a modification range of the processing power or maximum processing speed under contract, 3030 initial performance value upon introduction of computer, thick line shown by 3040 actual processing power or speed, and meshed portion shown by 3050 actual accounting range. FIG. 7A shows a model for calculating the charge of the perfect measured rate system. FIG. 7B shows a model of a measured rate system in which the upper limit of the performance is set in the modification range of the processing power under contract and the performance is limited thereto. FIG. 8A shows a model of the fixed charge. FIG. 8B shows a model using the measured rate system for use in case where a previously set performance is exceeded. FIG. 9 shows a model of a measured rate system in which an upper limit is set in the performance under contract and the performance is limited thereto.

Figure 10:
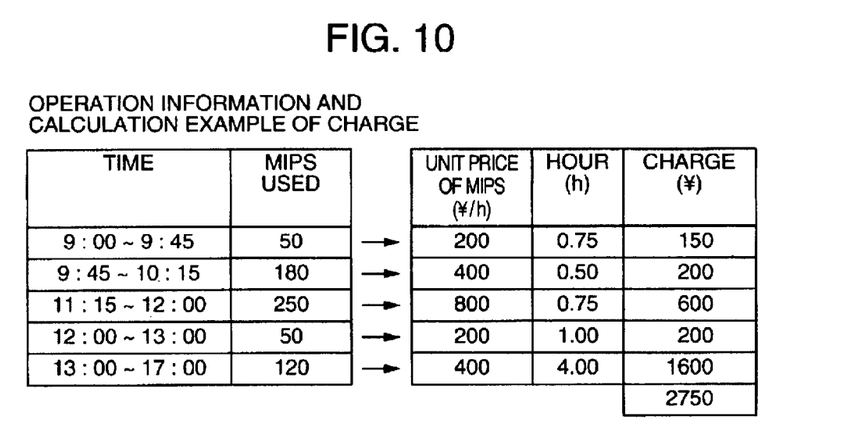
FIG. 10 is a diagram showing examples of calculation of the charges for using.

FIG. 10 shows a calculation example of the charge for using. The left-hand table shows the history information stored in the history memory unit 50 and the right-hand table shows a calculation example of the charge based on the history information.

Referring now to FIGS. 2A, 7B and 10, the method of calculating the charge on the basis of the history information of operation is described by taking the case where the kind of contract is B (measured rate system within designated contact) as an example. According to the control information portion 1 of the control information table shown in FIG. 2A, this contract has the kind of contract being B (measured rate system within designated contract), the duration of contract being 37 months and the modification range of performance being 250 to 50 MIPS.

The charge for using is calculated by multiplying the unit price of MIPS by an operation time. As shown in FIG. 10, the operation history being operated at 50 MIPS is left for 45 minutes from 9:00 to 9:45. Further, since the unit price of MIPS upon contract is 200 ¥/h as shown in the control information portion 3 of FIG. 2E, the charge for this period is 200(¥/h)×0.75(h)=¥150. Hereinafter, calculation is made similarly and the charge for 9:00 to 17:00 is ¥2,750.

Further, an example is described in which when the duration of contract is longer than or equal to a fixed duration, the charge is reduced to be calculated. In this example, the duration of contract is 37 months and when the reduction rate of 20% of the control information 3 as shown in FIG. 2D is applied, the charge is ¥2,200.

The charge is calculated by means of the operation terminal 90 or the like. The calculated charge can be collected by sending a detailed statement of utilization and a bill to the contracted user and being paid from the contracted user's bank account.

As described above, according to the embodiment, delay of operation due to lack of the power of CPU caused by temporary increase of the operation amount can be mitigated or avoided. Further, the charge system can be selected in conformity with practical use in response to various forms and demands of the users to thereby reduce the operation cost.

As described above, according to the present invention, since the performance of the operation control unit is modified in accordance with the rate of operation, there can be provided the performance control apparatus that can exhibit the performance conformable to variation in the amount of operation.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A performance control apparatus comprising:

operation processing means that can control performance represented by the number of instructions executed per unit time;

monitoring means that measures the performance of said operation processing means at predetermined intervals;

performance control means that controls to modify the performance of said operation processing means;

control information memory means that stores control information which is a standard for modifying the performance of said operation processing means; and history information memory means that stores history information of the performance of said operation processing means measured by said monitoring means;

said performance control means controlling the performance of said operation processing means on the basis of said control information and said history information.

2. A performance control apparatus according to claim 1, wherein said monitoring means measures the rate of operation of said operation processing means.

3. A performance control apparatus according to claim 1, wherein said control means modifies the performance of said operation processing means when the state that the rate of operation is outside a predetermined range is continued for a predetermined time or more.

4. A performance control apparatus according to claim 1, wherein the performance of said operation processing means is modified by insertion of dummy step.

5. A performance control apparatus according to claim 1, wherein the performance of said operation processing means is modified by change of a clock frequency of said operation processing means.

6. A performance control apparatus according to claim 1, wherein said control information is modified on the basis of a request sent from a terminal.

7. A performance control apparatus according to claim 1, wherein said control information can be modified through a network.

8. A performance control apparatus according to claim 1, comprising accounting means that calculates a charge for using said operation processing means to make billing.

9. A performance control apparatus according to claim 8, wherein said charge for using is calculated on the basis of said history information.

10. A method of controlling performance in a data processing apparatus including operation processing means that can control performance represented by the number of instructions executed per unit time, comprising the following steps of:

measuring the performance of said operation processing means at predetermined intervals;

storing control information which is a standard for modifying the performance of said operation processing means;

storing history information of the measured performance of said operation processing means; and controlling the performance of said operation processing means on the basis of said control information and said history information.

* * * * *